United States Patent
Cooper

(10) Patent No.: US 10,723,078 B2
(45) Date of Patent: Jul. 28, 2020

(54) METHOD OF ALIGNING PIXELATED LIGHT ENGINES

(71) Applicant: 3D Systems, Inc., Rock Hill, SC (US)

(72) Inventor: Guthrie Cooper, Mill Spring, NC (US)

(73) Assignee: 3D Systems, Inc., Rock Hill, SC (US)

(*) Notice: Subject to any disclaimer, the term of this patent is extended or adjusted under 35 U.S.C. 154(b) by 328 days.

(21) Appl. No.: 15/718,103

(22) Filed: Sep. 28, 2017

(65) Prior Publication Data

US 2019/0091934 A1 Mar. 28, 2019

(51) Int. Cl.

| | | |
|---|---|---|
| *B29C 64/30* | (2017.01) | |
| *B29C 64/393* | (2017.01) | |
| *B33Y 50/02* | (2015.01) | |
| *B33Y 10/00* | (2015.01) | |
| *G06T 7/30* | (2017.01) | |
| *B29C 64/129* | (2017.01) | |
| *H04N 1/40* | (2006.01) | |
| *H04N 1/00* | (2006.01) | |
| *B33Y 30/00* | (2015.01) | |
| *B29C 64/124* | (2017.01) | |
| *B29C 64/386* | (2017.01) | |

(52) U.S. Cl.
CPC .......... *B29C 64/393* (2017.08); *B29C 64/124* (2017.08); *B29C 64/129* (2017.08); *B29C 64/386* (2017.08); *B33Y 10/00* (2014.12); *B33Y 30/00* (2014.12); *B33Y 50/02* (2014.12); *G06T 7/30* (2017.01); *H04N 1/00251* (2013.01); *H04N 1/40056* (2013.01)

(58) Field of Classification Search
CPC .......... H04N 1/00127; H04N 1/00251; H04N 1/40056; G06T 7/30; G06T 7/32; G06T 7/33; G06T 7/337; G06T 7/344; B29C 64/393; B29C 64/386; B29C 64/124; B29C 64/129; B33Y 30/00; B33Y 10/00; B33Y 50/02

See application file for complete search history.

(56) References Cited

FOREIGN PATENT DOCUMENTS

| EP | 2186625 | 5/2010 | |
|---|---|---|---|
| EP | 2186625 B1 * | 12/2016 | ............. G06T 5/006 |
| WO | 2015040185 | 3/2015 | |

OTHER PUBLICATIONS

PCT International Search Report for International Search Authority for PCT/US2018/047168, dated Dec. 14, 2018 (6 pages).
PCT Written Opinion for International Search Authority for PCT/US2018/047168, dated Dec. 14, 2018 (6 pages).

* cited by examiner

*Primary Examiner* — Joseph S Del Sole
*Assistant Examiner* — Jamel M Nelson

(57) ABSTRACT

A three dimensional printing system includes a plurality of light engines, an alignment article, a camera, and a controller. The plurality of light engines define a corresponding plurality of build fields which overlap and define a build plane. The alignment article carries an alignment calibration image and is configured to be mounted in the three dimensional printing system with the alignment calibration image proximate to the build plane and in facing relation with the plurality of light engines. The alignment calibration image defines a dark field with an array of reflective alignment targets. The camera is mounted to be in facing relation to the alignment calibration image. The controller is configured to operate at least the light engines and the camera to individually align the light engines to the alignment calibration image.

10 Claims, 7 Drawing Sheets

METHOD OF ALIGNING PIXELATED LIGHT ENGINES

FIELD OF THE INVENTION

The present disclosure concerns an apparatus and method for the digital fabrication of three dimensional articles of manufacture through the solidification of liquid photoncurable (photocure) resins using plural light engines. More particularly, the present disclosure concerns an accurate and efficient method of aligning plural light engines to provide large, high quality articles of manufacture.

BACKGROUND

Three dimensional (3D) printers are in rapidly increasing use. One class of 3D printers includes stereolithography printers having a general principle of operation including the selective curing and hardening of radiation curable (photocurable) liquid resins. A typical stereolithography system includes a resin vessel holding the photocurable resin, a movement mechanism coupled to a support surface, and a controllable light engine. The stereolithography system forms a three dimensional (3D) article of manufacture by selectively curing layers of the photocurable resin onto a "support fixture." Each selectively cured layer is formed at a "build plane" within the resin.

One class of stereolithography systems utilizes light engines based on spatial light modulators such as arrays of micromirrors. Such systems are generally limited by the pixel count of the spatial light modulator. There is a desire to provide systems having larger numbers of pixels to form larger and higher resolution articles of manufacture.

SUMMARY

Figure 1:
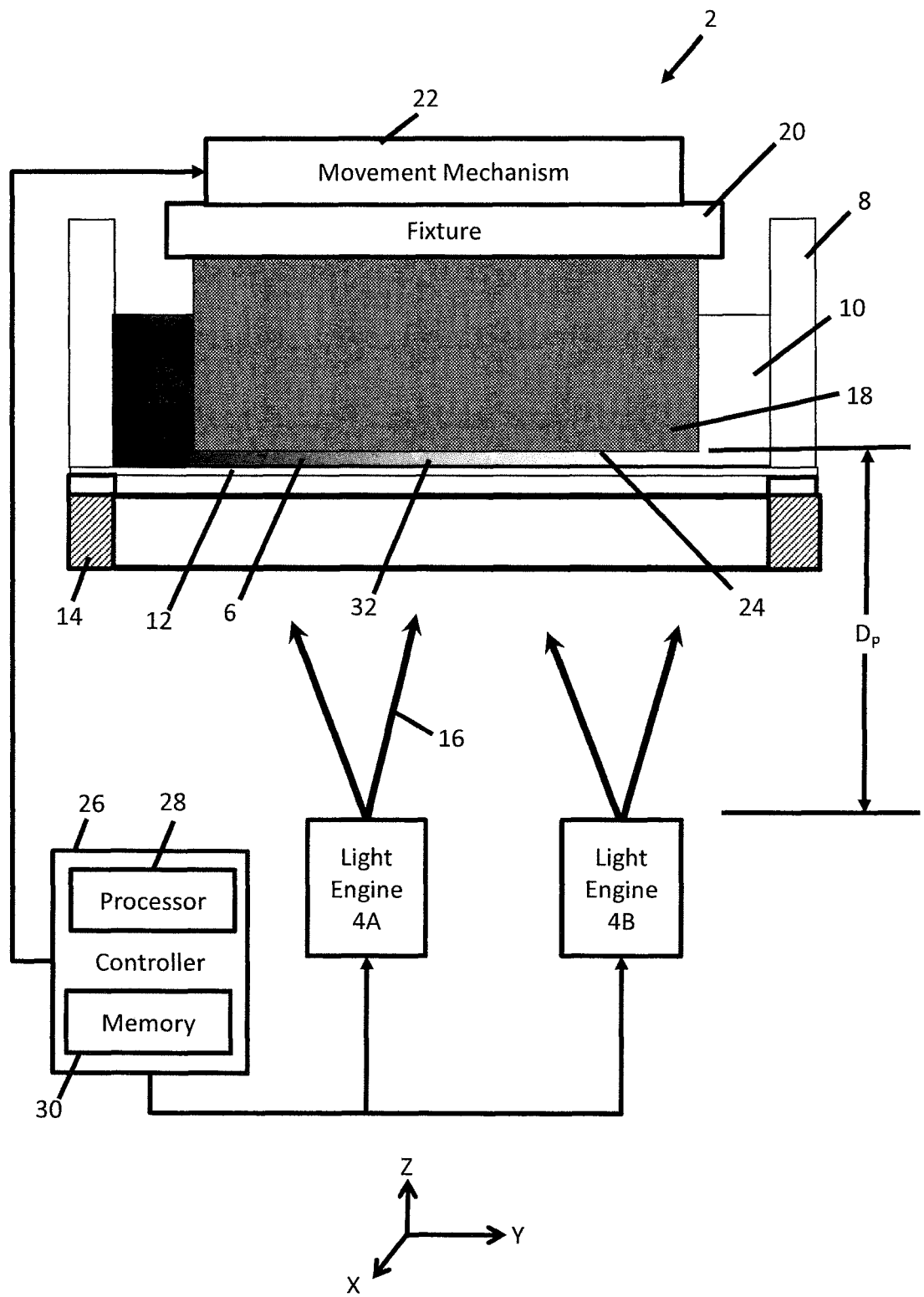
FIG. 1 is a simplified block diagram of a first embodiment of a three dimensional printing system in an operational configuration for forming a three dimensional article of manufacture.

In a first aspect of the disclosure, a three dimensional printing system includes a plurality of light engines, an alignment article, a camera, and a controller. The plurality of light engines defines a corresponding plurality of build fields which overlap and define a build plane. The alignment article carries an alignment calibration image and is configured to be mounted in the three dimensional printing system with the alignment calibration image proximate to the build plane and in facing relation with the plurality of light engines. The alignment calibration image defines a dark field with an array of reflective alignment targets. The camera is mounted to be in facing relation to the alignment calibration image. The controller is coupled to the plurality of light engines and to the camera. The controller includes a processor coupled to an information storage device. The information storage device stores instructions, that when executed by the processor, perform step including: (a) operate the plurality of light engines to project spots of light onto the alignment calibration image, (b) operate the camera to repeatedly capture the alignment calibration image including spots of light reflected from the reflective alignment targets, and (c) analyze the repeated captured calibration image to individually align the light engines to the alignment calibration image.

In one implementation the three dimensional printing system includes a support plate for supporting a resin vessel during an operational mode for forming a three dimensional article of manufacture. The resin vessel includes a transparent sheet that defines a lower bound for containing the resin. The plurality of light engines project pixelated light upwardly through the transparent sheet to define the build plane above the transparent sheet. Engagement between the alignment article and the support plate positions the alignment calibration image proximate to the build plane and facing downward. Proximate in this context means having the same or nearly the same vertical position to within 500 microns, within 250 microns, or within 125 microns.

In another implementation the plurality of light engines are configured to project pixelated light downwardly to define a build plane proximate to an upper surface of resin during an operational mode for forming a three dimensional article of manufacture. Engagement between the alignment article and the support plate positions the alignment calibration image proximate to the build plane and facing upward. Proximate in this context means having the same or nearly the same vertical position to within 500 microns, within 250 microns, or within 125 microns.

In yet another implementation the alignment article includes a rigid plate for mounting to the three dimensional printing system and a flexible sheet that defines the alignment calibration image and is supported by the surface of the rigid plate. The flexible sheet has an alignment pinhole formed therethrough. A pin extends from the rigid plate and through the pinhole to allow engagement between the pin and the pinhole to facilitate an azimuthal rotation of the flexible sheet with respect to the rigid plate. A user can manually rotate the flexible sheet in response to instructions from a user interface. At a desired degree of azimuthal alignment, the user can "lock" the alignment in place by dispensing a fluid such as alcohol between the flexible sheet and the rigid plate.

In a further embodiment the controller is configured to capture an image of the reflective targets and compute an azimuthal error of the alignment calibration image with respect to the camera. The controller is further configured to display instructions on a user interface to instruct a user to manually correct the azimuthal error.

In a yet further embodiment the controller is further configured to capture an image of the reflective targets, and compute an azimuthal error of the alignment calibration image with respect to the camera. The controller is further configured to provide a motorized relative motion of the alignment calibration image with respect to the camera to automatically correct the azimuthal error.

In another embodiment the three dimensional printing system includes a resin level sensor. The controller is further configured to receive information from the resin level sensor and to control the level of the resin proximate to the build plane whereby the vertical positions of the resin upper surface and the alignment calibration are substantially the same.

In yet another embodiment the controller is configured to provide instructions on a user interface to guide a user in adjusting the mechanical alignment of the light engines with respect to the alignment calibration image. In a further embodiment the controller aligns the individual light engines in software. In a yet further embodiment, the controller provides user instructions on a user interface to guide a user in adjusting the mechanical alignment of the light engines with respect to the alignment calibration image and then follows the mechanical adjustment with a software alignment.

In a second aspect of the disclosure, a three dimensional printing system includes a plurality of light engines, an alignment article, a camera, and a controller. The plurality of light engines define a corresponding plurality of build fields which overlap and define a build plane. The alignment article carries an alignment calibration image and is configured to be mounted in the three dimensional printing system with the alignment calibration image proximate to the build plane and in facing relation with the plurality of light engines. The alignment calibration image defines a dark field with an array of reflective alignment targets. The camera is mounted to be in facing relation to the alignment calibration image. The controller is coupled to the plurality of light engines and to the camera. The controller includes a processor coupled to an information storage device. The information storage device stores instructions, that when executed by the processor, perform steps including: (a) operate the camera to capture an image of the reflective targets, (b) compute an azimuthal error of the alignment calibration image with respect to the camera, (c) correct the azimuthal error by one of (i) providing instructions to a user on a user interface for a manual rotational correction or (ii) automatically adjusting a rotational alignment between the camera and the alignment calibration image, (d) operate the camera to repeatedly capture the alignment calibration image including spots of light reflected from the reflective alignment targets, and (e) analyze the repeated captured calibration image to individually align the light engines to the alignment calibration image.

DETAILED DESCRIPTION OF THE PREFERRED EMBODIMENTS

FIG. 1 is a simplified schematic block diagram of a first embodiment of a three dimensional printing system 2 that has a plurality of light engines 4 (illustrated as 4A and 4B) for providing a composite build plane 6. Printing system 2 includes a novel alignment calibration system that improves the ease and accuracy of properly aligning the light engines 4. While only two light engines 4A and 4B are illustrated in FIG. 1, it is to be understood that any number of light engines 4 can be utilized by three dimensional printing system 2 in various linear or two dimensional arrangements to form a composite build plane 6.

In describing the three dimensional printing system 2, mutually perpendicular axes X, Y and Z will be used. Axes X and Y are lateral axes. In some embodiments X and Y are also horizontal axes. In some embodiments Z is a vertical axis. In some embodiments the direction +Z is generally upward and the direction −Z is generally downward.

In addition, spherical coordinate angles $\theta$ and $\phi$ will be used. The angle $\theta$ is a polar angle measured with respect to the +Z direction. Thus, an upward direction (along the Z-axis) represents a value of $\theta=0$, a horizontal direction represents a value of $\theta=90$ degrees (or $\pi/2$) and a downward direction represents a value of $\theta=180$ degrees (or $\pi$). The angle $\phi$ is an azimuthal angle that is a measure of rotation about the Z-axis. The X-axis has a value of $\phi=0$ degrees. The Y-axis has a value of $\phi=90$ degrees (or $\pi/2$). The −X axis has a value of $\phi=180$ degrees (or $\pi$).

The three dimensional printing system 2 includes a resin vessel 8 containing a photocurable resin 10. The resin vessel 8 includes a transparent sheet 12 that defines a lower bound for the photocurable resin 10. The resin vessel 8 is supported on a support plate 14. Support plate 14 is attached to a machine base (not shown) of the three dimensional printing system 2 and provides support and alignment for various components of the three dimensional printing system 2 related to and including the resin vessel 8.

Positioned below the support plate 14 are the light engines 4. The light engines 4 project pixelated light 16 up to the composite build plane 6. A distance from the light engines 4 to the build plane 6 is represented by distance $D_P$. The light engines are linearly aligned along lateral axes X and Y and are rotationally aligned with respect to axes $\theta$ and $\phi$. The alignment includes both mechanical and software alignment. The light engines 4 have a focal length that is optimized for the build plane distance $D_P$.

A three dimensional article of manufacture 18 is supported over and within the resin vessel 8 by a support fixture 20. A movement mechanism 22 is coupled to and provides vertical positioning and motion for the support fixture 20. In particular, the movement mechanism 22 adjusts a position of a lower face or end 24 of the three dimensional article of manufacture 18.

Figure 3:
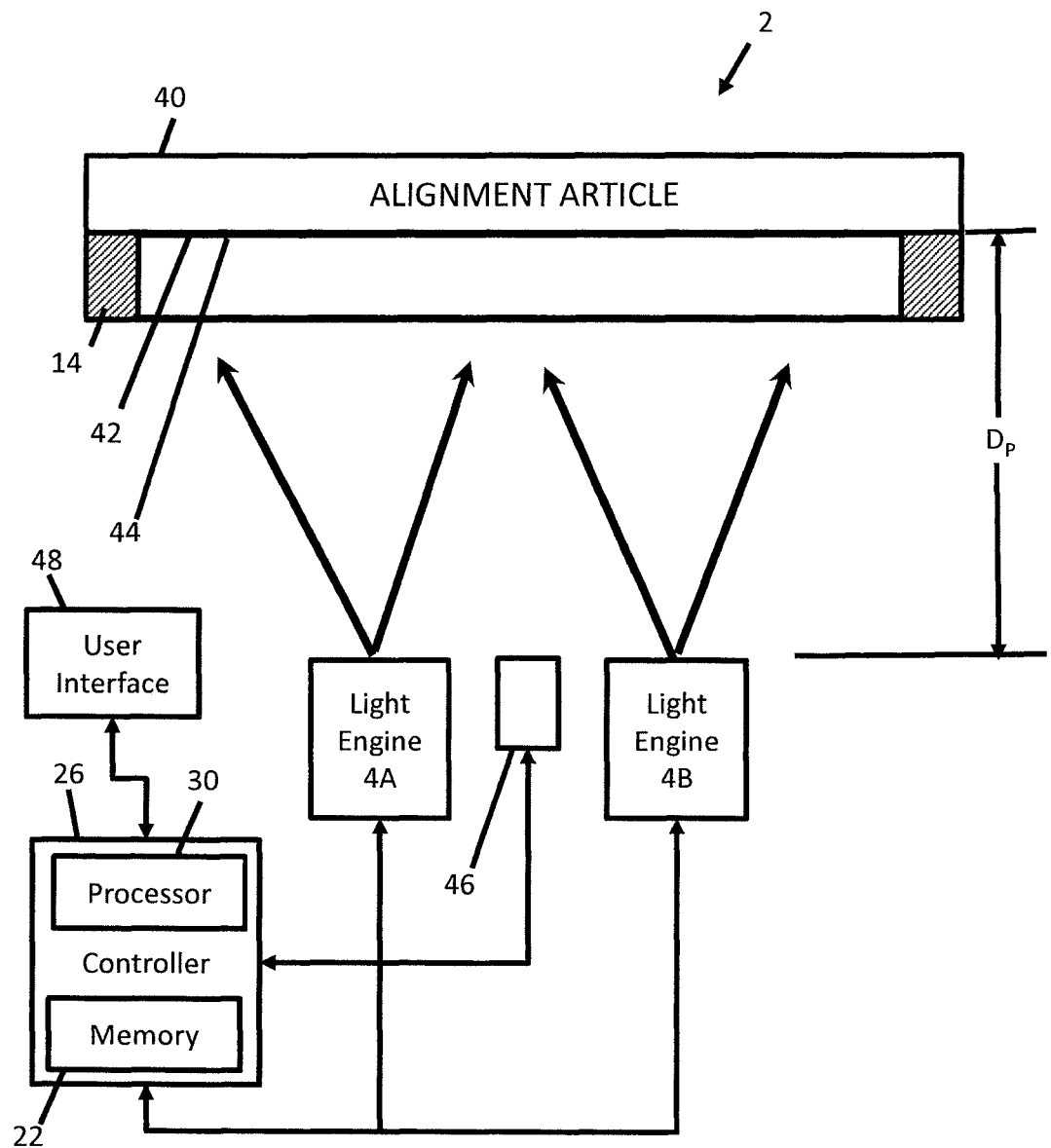
FIG. 3 is a simplified block diagram of the first embodiment of the three dimensional printing system in a calibration configuration for purposes of aligning plural light engines.

A controller 26 is electrically or wirelessly coupled to the light engines 4, the movement mechanism 22, and other portions of the three dimensional printing system 2. Controller 26 includes a processor 28 coupled to an information storage device 30. The information storage device 30 includes a non-transient or non-volatile storage device that stores instructions that, when executed by the processor, control the light engines 4, the movement mechanism 22, and other portions of the three dimensional printing system 2. This includes providing either an operational mode or a calibration mode. An operational mode is used to form the three dimensional article of manufacture 18 when the three dimensional printing is in the operational configuration as illustrated in FIG. 1. The calibration mode is used to align the light engines 4 when the three dimensional printing system is in the calibration configuration as illustrated in FIG. 3. Controller 26 can located at one location or distributed at multiple locations within printing system 2.

Between the transparent sheet 12 and the lower face 24 of the three dimensional article of manufacture 18 is a thin layer of resin 32 that includes the build plane 6. The thin layer of resin 32 includes the build plane 6 which is actually a very thin layer of resin that is being selectively cured by the action of the light engines 4 onto the lower face 24.

Figure 2:
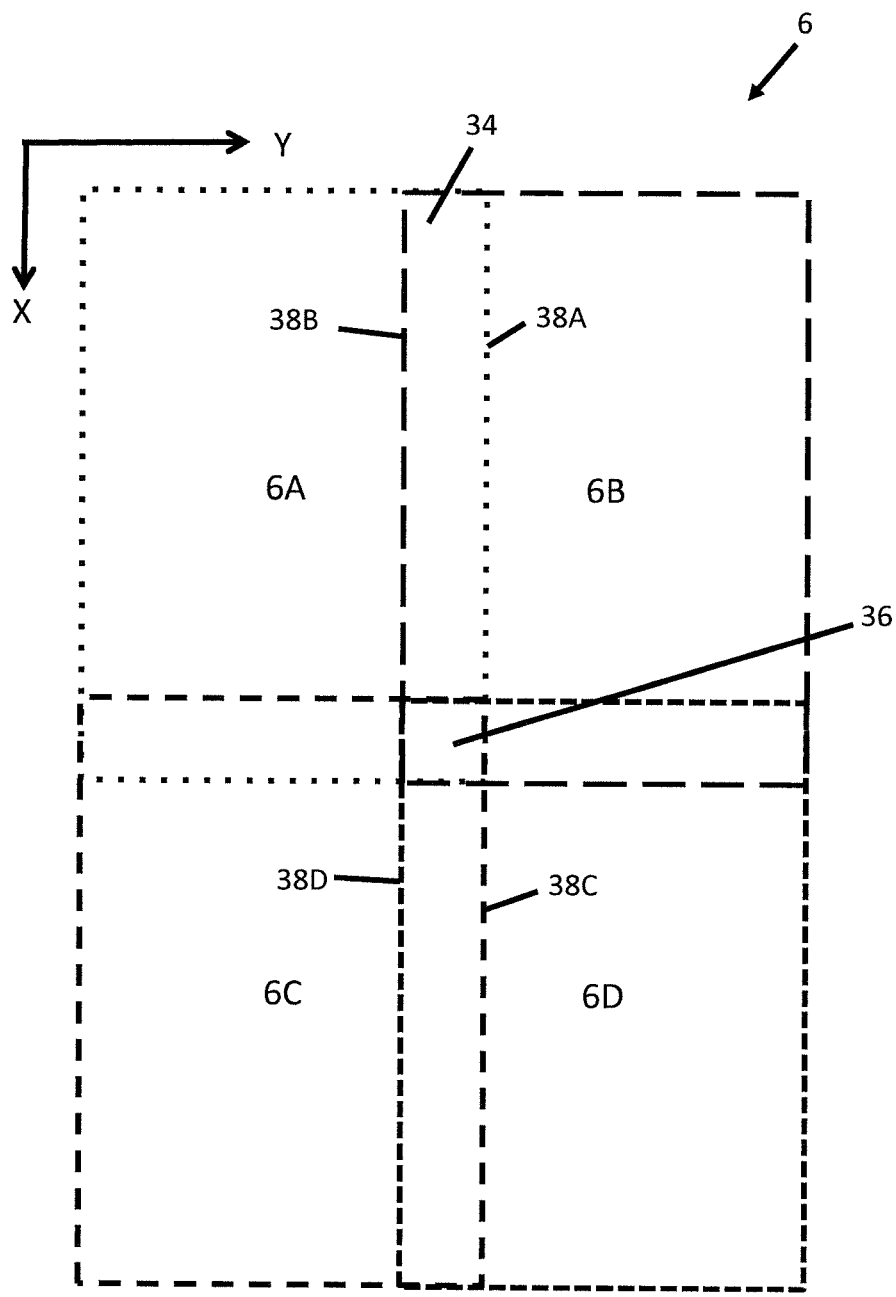
FIG. 2 is a schematic illustration of a composite build plane that is a composite of four build fields corresponding to four light engines.

FIG. 2 schematically depicts a build plane 6 formed by the action of four light engines 4A, 4B, 4C, and 4D. The light engines 4A, 4B, 4C, and 4D define four build fields 6A, 6B, 6C, and 6D respectively that are represented by four different dashed line patterns. The build fields 6A, 6B, 6C, and 6D overlap to form the composite build field 6. Pairs of build fields define overlap zones 34. A central overlap zone 36 exists where all four build fields 6A, 6B, 6C, and 6D overlap. The build fields 6A, 6B, 6C, and 6D have outer edges 38A, 38B, 38C, and 38D respectively.

FIG. 3 depicts the first embodiment of the three dimensional printing system 2 in a calibration configuration. The resin vessel 8 has been removed from the support plate 14 and replaced with an alignment article 40. The alignment article 40 includes a lower portion or calibration surface 42 that bears an alignment calibration image 44. The surface 42 faces downwardly toward the plurality of light engines 4 (illustrated as 4A and 4B). A vertical distance between surface 42 and the light engines preferably equals $D_P$, the build plane vertical distance.

The vertical distance of calibration surface 42 to light engine 4 preferably equals the vertical distance of build plane 6 to light engine 4 to within 500 microns. More preferably the vertical distance of calibration surface 42 to light engine 4 preferably equals the vertical distance of build plane 6 to light engine 4 to within 250 microns or yet more preferably to within 125 microns.

Disposed in facing relation with the calibration surface 42 is a camera 46. The camera 46 is configured to capture the alignment calibration image 44 and light that the alignment calibration image 44 reflects from light engines 4.

A user interface 48 is wirelessly or electrically coupled to the controller 26. The user interface 48 minimally includes a display such as a touchscreen for communicating between a user of the three dimensional printing system 2 and the three dimensional printing system 2.

The controller 26 is configured to operate the light engines 4 to selectively illuminate the alignment calibration image 44 and to receive captured images from camera 46. The controller 26 analyzes the captured images and, in response, facilitates or activates alignment processes between the light engines 4, alignment calibration image 44, and the camera 46.

Figure 4A:
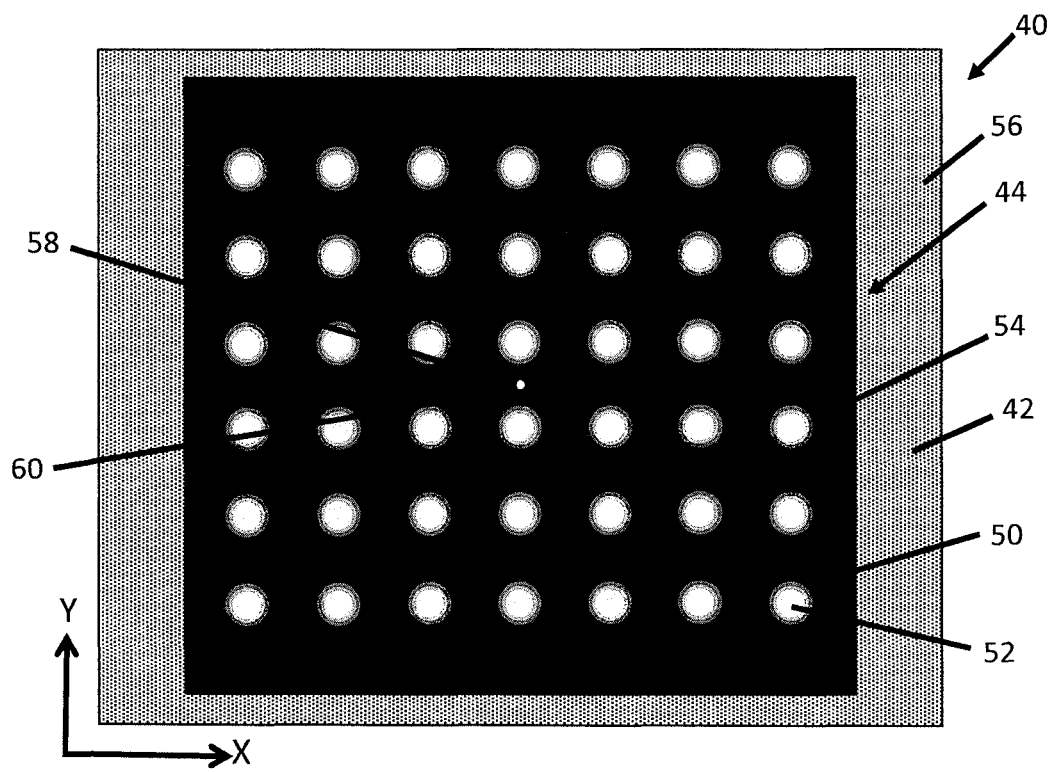
FIG. 4A is a simplified illustration of a first embodiment of an alignment article.
Figure 4B:
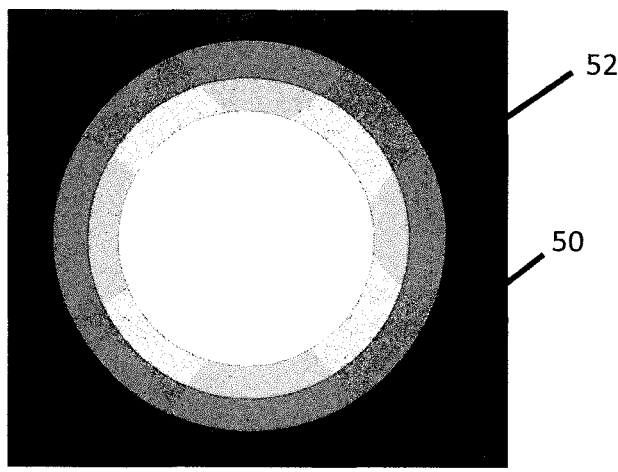
FIG. 4B illustrates higher magnification details of a reflective target from the alignment article of FIG. 4A.

FIG. 4A depicts a simplified first embodiment of the calibration surface 42 of alignment article 40. Calibration surface 42 bears the alignment calibration image 44. Alignment calibration image 44 is a dark field image having a black, dark, or generally energy absorbing area 50 with an array of reflective targets 52. The reflective targets 52 are illustrated as reflective circles with an inner white portion and concentric portions of varying reflectivity. However, other reflective targets 52 such as white crosses, squares, or other shapes can also be used. There is a strong contrast in energy absorption between the energy absorbing area 50 and the reflective targets 52 that facilitates an alignment process including image capture by the camera 46. FIG. 4B illustrates detail of a single exemplary target 52 surrounded by the energy absorbing area 50. The single exemplary target 52 includes a central white solid circle surrounded by concentric circles of decreasing reflectivity with increasing radius from a center of the solid white circle. It is to be understood that FIG. 4A is simplified and not to scale. FIG. 4A depicts 42 (7×6 array) targets 52 while in practice many more smaller targets 52 can be used to optimize image processing, analysis, and alignment.

In one embodiment, the alignment article 40 includes a sheet of flexible film 54 mounted to a rigid plate 56. The sheet 54 bears the alignment calibration image 44 and includes a central pin hole 58. A pin 60 extends from the rigid plate 56 and through the pin hole 58. This provides a means for a user to rotate the calibration image 44 with respect to the azimuthal angle 4) relative to the camera 46 and to thereby rotationally align the array of targets 52 to a pixel array of the camera 46. The flexible sheet 54 is formed from a dimensionally accurate and stable material. In one particular embodiment, the flexible sheet 54 is formed from a heat resistant and dimensionally stable biaxially oriented polyethylene terephthalate (BoPET).

Figure 5:
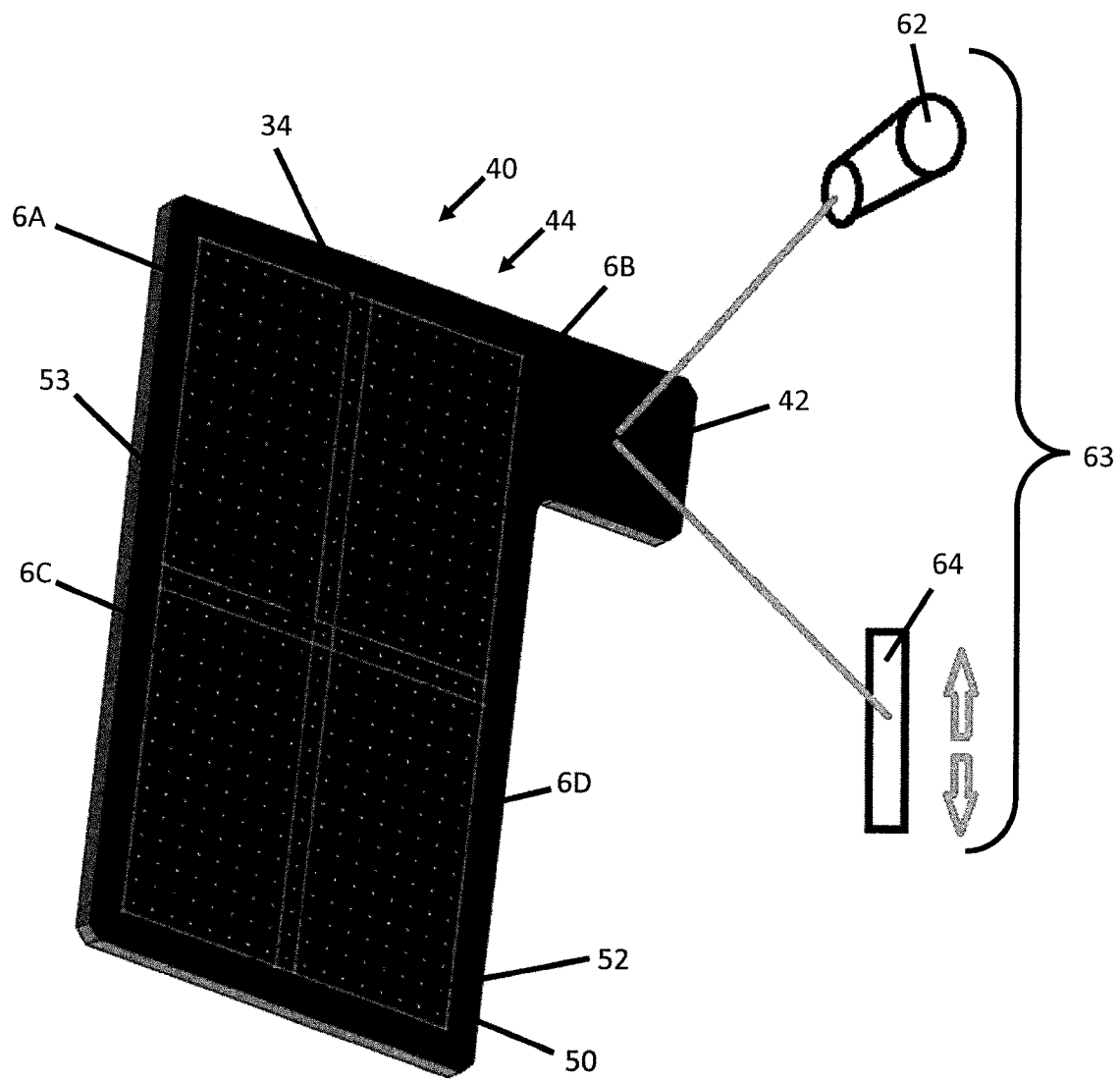
FIG. 5 is an illustration of a second embodiment of an alignment article.

FIG. 5 depicts a second embodiment of the alignment article 40 that is illustrated close to scale. The alignment calibration image 44 has a dark (energy absorbing) field 50 and a rectangular array of the reflective targets 52. Also depicted are the overlapping build field boundaries 6A, 6B, 6C, and 6D that overlap and define the composite build plane 6. In a preferred embodiment, the reflective targets 53 include a central reflective target 53 that is shared by all four projectors and is therefore located in the central overlap zone 36 of the four build fields. The central reflective target 53 also preferably defines a rectilinear center ($X=Y=0$) and a center of rotation for azimuthal adjustment. This simplifies spatial computations and alignments.

In some embodiments, some or all of the targets 52 can be emissive. This would eliminate a need to effectively illuminate targets 52 during an alignment between the alignment calibration image 44 and the camera 46. Providing emissive targets 52 can be accomplished via backlighting (from back toward surface 42) with a light source such as an array of light emitting diodes or an electroluminescent emitter to name two examples.

A laser 62 is configured to emit a light beam that impinges upon the calibration surface 42 and is received by a detector 64. The laser 62 and detector can be part of the three dimensional printing system 2 and are coupled to the controller 26. The laser 62 and detector 64 form a distance measurement system 63 for detecting and determining key distances such as the distance $D_P$ from the light engines 4 to the alignment calibration image 44. In some embodiments, more than one laser 62 can be used. In other embodiments, one or more lasers 62 can be utilized as part of a system for leveling the alignment article 40.

Figure 6:
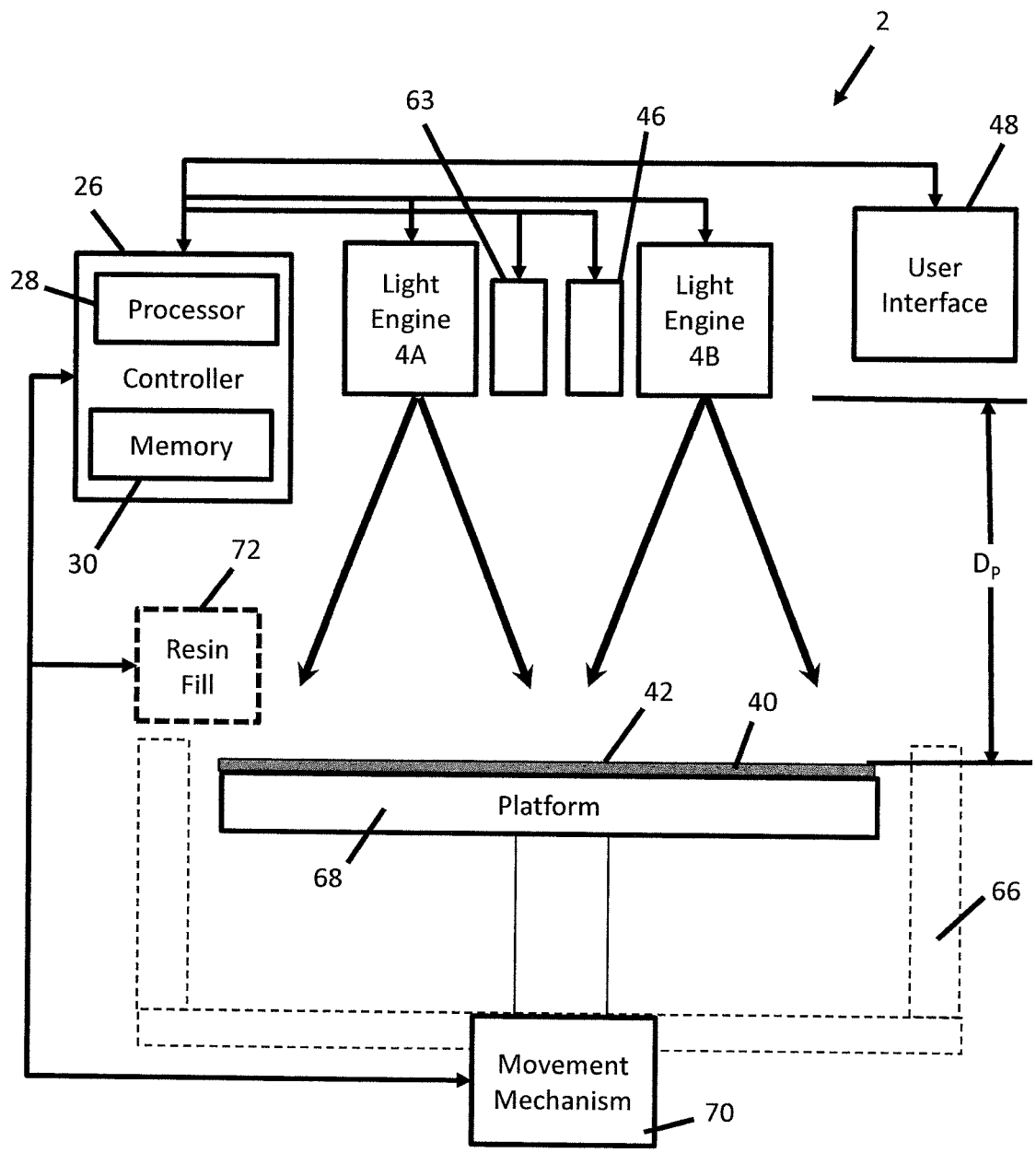
FIG. 6 is a simplified block diagram of a second embodiment of a three dimensional printing system in a calibration configuration.

FIG. 6 depicts a second embodiment of a three dimensional printing system 2. The embodiment illustrated in FIG. 6 differs from that of FIGS. 1 and 3 in that the build plane 6 is proximate to a top surface of photocurable resin in a resin vessel 66. Resin vessel 66 is depicted by dashed lines and, unlike resin vessel 6 (of FIG. 2), resin vessel 66 does not have a transparent sheet 12. A three dimensional article of manufacture is formed on top of a build platform 68 that is lowered by movement mechanism 70 into the photocure resin so that the build plane 66 is proximate with an upper face or surface of the three dimensional article of manufacture.

FIG. 6 illustrates the three dimensional printing system 2 in a calibration configuration. Resin vessel 66 and resin fill apparatus 72 (for replenishing resin in resin vessel 66) are shown as dashed lines because they may be removed during a calibration process. Like element numbers in FIG. 6 depict elements having a similar function but possibly a different configuration than those depicted in FIGS. 1 and 3.

Positioned below light engines 4 (illustrated as 4A and 4B) is an alignment article 40 having calibration surface 42. Calibration surface 42 and light engines 4 are in facing relation with respect to each other. Calibration surface 42 includes an alignment calibrating image 44. Alignment article 40 can be similar to or the same as any of the alignment articles 40 described with respect to any of FIGS. 4A, 4B, and 5.

The three dimensional printing system 2 includes a distance measurement system 63 (in one embodiment a laser 62 and detector 64) for measuring a vertical distance from the light engines 4 to the build plane 6 (top of resin in this illustration) during operation or to the calibration surface 42 during calibration. Camera 46 is above and in facing relation with the calibration surface 42. Controller 26 is coupled to light engines 4, camera 46, user interface 48, distance measurement system 63, movement mechanism 70, resin fill system 72, and other portions of the three dimensional printing system 2.

In some embodiments, the three dimensional printing system 2 incorporates a leveling capability for leveling the alignment article 40 (and hence the calibration surface 42) with respect to a gravitational reference. This assures that the alignment article 40 is parallel to the build plane 6. Leveling capabilities can include one or more of bubble levels (visible air bubble in a liquid) or electronic level sensors. Alternatively, the leveling capability can be based on one or more lasers 62 sensing distance to multiple points on the calibration surface 42. The light engines 4 also incorporate leveling capability whereby their respective vertical axes are aligned with the gravitational reference.

For all embodiments encompassing FIGS. 1, 3, and 6, the controller 26 is configured to operate the three dimensional printing system 2 in at least two different modes including a calibration mode and an operational mode. During a calibration mode, the controller 26 operates the three dimensional printing system 2 to align the light engines 4 with respect to the alignment calibration image 44. During the operational mode, the controller operates the three dimensional printing system 2 to form a three dimensional article of manufacture 18.

In some large array embodiments more than one camera 46 is used for aligning the light engines 4. This may be preferred arrays that utilize six or more light engines (such as a 2×3 array).

Figure 7:
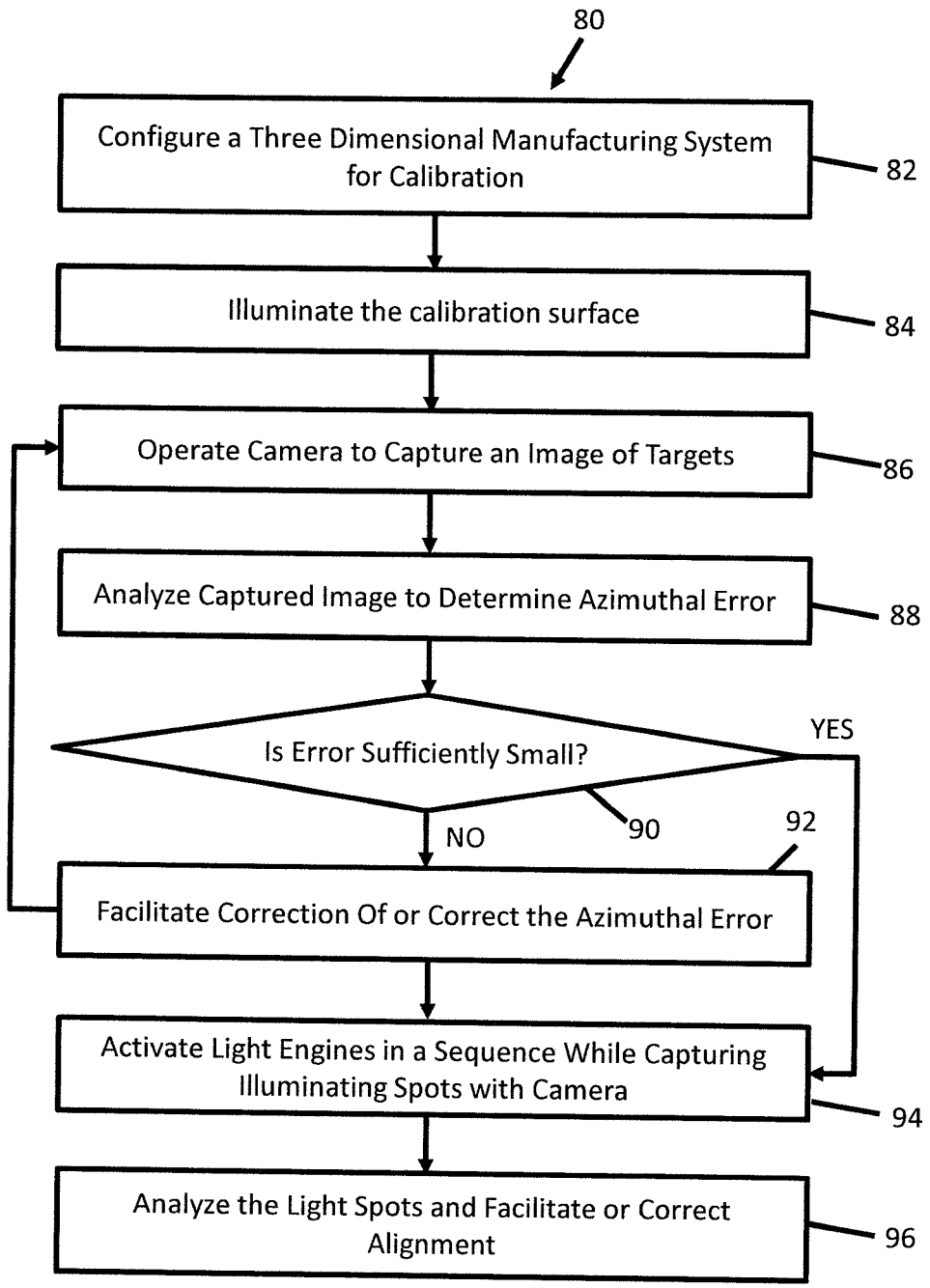
FIG. 7 depicts a calibration mode procedure for a three dimensional printing system for aligning a plurality of light engines.

FIG. 7 depicts the calibration mode procedure 80 for a three dimensional printing system 2 as described in any of FIG. 3 or 6. According to step 82 the three dimensional printing system 2 is configured for the calibration mode. This can include uninstalling a resin vessel (8 or 66) and installing an alignment article 40 with a calibration surface 42 in facing relation with the light engines 4 and the camera 46.

According to step 84 the calibration surface 42 is illuminated. Illumination can be provided using the light engines 4 or other light sources. According to step 86, the camera is operated to capture the alignment calibration image 44. According to step 88, the controller uses the captured alignment calibration image 44 to determine an azimuthal error $\Delta\phi$ which is a discrepancy in azimuthal alignment between the array of targets 52 and a pixel array of the camera 46. According to step 90, a determination is made as to whether $\Delta\phi$ is sufficiently small in magnitude. If the absolute value of $\Delta\phi$ is below a threshold, then the process proceeds to step 94. Otherwise, the process proceeds to step 92.

According to step 92, the controller 26 facilitates correction of or corrects the azimuthal error $\Delta\phi$. According to a first embodiment, the controller 26 automatically adjusts a relative azimuthal alignment between the camera 46 and the alignment calibration image 44. According to a second embodiment, the controller 26 provides instructions on the user interface 48 to aid the user in adjusting the azimuthal error $\Delta\phi$. In an embodiment described with respect to FIG. 4A, the user manually adjusts the azimuthal angle by manually rotating a flexible film 54 with respect to a rigid plate 56. When the azimuthal error $\Delta\phi$ has a sufficiently small magnitude, the user places a fluid between the flexible film 54 and the rigid plate 56 to provide a temporary hold between them. After step 92 process then loops back to step 86.

According to step 94, the light engines 4 are activated in a pixelated sequence to generate a sequence of reflecting light spots on the targets 52 of the alignment calibration image 44. Also during step 94, the camera 46 is capturing images of the reflected light spots.

According to step 96, the light spots generated by the light engines 4 are analyzed. As part of step 96, the light engines are individually aligned to the array of targets 52. In one embodiment, step 96 includes a mechanical alignment to correct translational angular and positional errors of the individual light engines 4. The mechanical alignment can be motorized or facilitated by the user interface 48. In another embodiment, step 96 includes a software alignment to identify reflected spot or pixel locations generated by the light engines on the targets 52. In an third and exemplary embodiment, step 96 includes a mechanical alignment followed by a software alignment.

During the operational mode of the three dimensional printing system 2 described in FIG. 6, the measurement system 63 is operated to determine a level of the resin in the resin vessel 66. If the level is below a certain threshold, the resin fill apparatus is operated to provide a build plane distance $D_P$ that matches the distance between the distance from light engines 4 and the calibration surface 42.

The specific embodiments and applications thereof described above are for illustrative purposes only and do not preclude modifications and variations encompassed by the scope of the following claims.

What is claimed:

1. A three dimensional printing system comprising:
 a plurality of light engines that define a corresponding plurality of build fields which overlap and define a build plane;
 an alignment article carrying an alignment calibration image and configured to be mounted in the three dimensional printing system with the alignment calibration image proximate to the build plane and in facing relation with the plurality of light engines, the alignment calibration image defining a dark field with an array of reflective alignment targets;
 a camera mounted to be in facing relation to the alignment calibration image;
 a controller coupled to the plurality of light engines and to the camera, the controller including a processor coupled to an information storage device, the information storage device storing instructions, that when executed by the processor, perform steps including:
 (a) operate the plurality of light engines to project spots of light onto the alignment calibration image;
 (b) operate the camera to repeatedly capture the alignment calibration image including spots of light reflected from the reflective alignment targets; and
 (c) analyze the repeated captured calibration image to individually align the light engines to the alignment calibration image;
 the controller is further configured to:
 capture an image of the reflective targets; and
 compute an azimuthal error of the alignment calibration image with respect to the camera.

2. The three dimensional printing system of claim 1 further comprising a support plate for supporting a resin vessel during an operation mode for forming a three dimensional article of manufacture, the resin vessel including a transparent sheet that defines a lower bound for containing resin, the plurality of light engines project pixelated light upwardly through the transparent sheet to define the build plane above the transparent sheet, engagement between the alignment article and the support plate positions the calibration image proximate to or at the build plane and facing downward.

3. The three dimensional printing system of claim 1 wherein the plurality of light engines are configured to project pixelated light downwardly to define a build plane proximate to an upper surface of resin during an operational mode for forming a three dimensional article of manufacture, engagement between the alignment article and the support plate positions the alignment calibration image proximate to the build plane and facing upward.

4. The three dimensional printing system of claim 1 wherein the alignment article includes:
  a rigid plate for mounting to the three dimensional printing system; and
  a flexible sheet that defines the alignment calibration image and is supported by the surface of the rigid plate.

5. The three dimensional printing system of claim 1 wherein the controller is further configured to display instructions on a user interface to instruct a user to manually correct the azimuthal error.

6. The three dimensional printing system of claim 1 wherein the controller is further configured to provide a motorized relative motion of the alignment calibration image with respect to the camera to automatically correct the azimuthal error.

7. The three dimensional printing system of claim 1 further comprising a resin level sensor and wherein the controller is further configured to receive information from the resin level sensor and to control the level of the resin proximate to the build plane whereby the vertical positions of the resin upper surface and the alignment calibration are substantially the same.

8. A three dimensional printing system comprising:
  a plurality of light engines that define a corresponding plurality of build fields which overlap and define a build plane;
  an alignment article carrying an alignment calibration image and configured to be mounted in the three dimensional printing system with the alignment calibration image proximate to the build plane and in facing relation with the plurality of light engines, the alignment calibration image defining a dark field with an array of reflective alignment targets;
  a camera mounted to be in facing relation to the alignment calibration image;
  a controller coupled to the plurality of light engines and to the camera, the controller including a processor coupled to an information storage device, the information storage device storing instructions, that when executed by the processor, perform steps including:
    (a) operate the plurality of light engines to project spots of light onto the alignment calibration image;
    (b) operate the camera to repeatedly capture the alignment calibration image including spots of light reflected from the reflective alignment targets; and
    (c) analyze the repeated captured calibration image to individually align the light engines to the alignment calibration image,
  the alignment article includes:
  a rigid plate for mounting to the three dimensional printing system; and
  a flexible sheet that defines the alignment calibration image and is supported by the surface of the rigid plate,
  wherein the flexible sheet has an alignment pinhole and further comprising a pin that extends from the rigid plate and through the pinhole to allow engagement between the pin and the pinhole to facilitate an azimuthal rotation of the flexible sheet with respect to the rigid plate.

9. A three dimensional printing system comprising:
  a plurality of light engines that define a corresponding plurality of build fields which overlap and define a build plane;
  an alignment article carrying an alignment calibration image and configured to be mounted in the three dimensional printing system with the alignment calibration image proximate to the build plane and in facing relation with the plurality of light engines, the alignment calibration image defining a dark field with an array of reflective alignment targets;
  a camera mounted to be in facing relation to the alignment calibration image;
  a controller coupled to the plurality of light engines and to the camera, the controller including a processor coupled to an information storage device, the information storage device storing instructions, that when executed by the processor, perform steps including:
    (a) operate the camera to capture an image of the reflective targets;
    (b) compute an azimuthal error of the alignment calibration image with respect to the camera;
    (c) correct the azimuthal error by one of (i) providing instructions to a user on a user interface for a manual rotational correction or (ii) automatically adjusting a rotational alignment between the camera and the alignment calibration image;
    (c) operate the plurality of light engines to project spots of light onto the alignment calibration image;
    (d) operate the camera to repeatedly capture the alignment calibration image including spots of light reflected from the reflective alignment targets; and
    (e) analyze the repeated captured calibration image for individually aligning the light engines to the alignment calibration image.

10. The method of claim 9 wherein the controller is further configured to perform at least one additional step including one or more of (i) providing instructions on a user interface to guide a user in adjusting the mechanical alignment of the light engines with respect to the alignment calibration image, and (ii) align the individual light engines in software.

* * * * *